June 2, 1970    N. W. MERRILL ETAL    3,514,991
BENDER TABLE ASSEMBLY

Filed June 12, 1968    7 Sheets-Sheet 6

June 2, 1970  N. W. MERRILL ETAL  3,514,991

BENDER TABLE ASSEMBLY

Filed June 12, 1968  7 Sheets-Sheet 7

United States Patent Office 3,514,991
Patented June 2, 1970

3,514,991
BENDER TABLE ASSEMBLY
Neal W. Merrill, Bethlehem, and William H. Schenck, York, Pa.; said Schenck assignor to Kroy Company, York, Pa., said Merrill assignor to Bethlehem Steel Corporation, a corporation of Delaware
Filed June 12, 1968, Ser. No. 736,396
Int. Cl. B21j 13/10
U.S. Cl. 72—420                                    13 Claims

ABSTRACT OF THE DISCLOSURE

A bender table assembly includes an entry end conveyor table aligned with a discharge end conveyor table. The conveyor tables are positioned on opposite sides of a metal bender for conveying metal stock to be bent to and from the bender. The discharge end conveyor table includes a movably mounted stop gauge assembly, and there is another movably mounted stop gauge on the bender. Both stop gauges are mounted on carriages and are motor driven, and the bender stop gauge is pivotable out of stopping position. The discharge end table stop gauge includes a collapsible stop plate movable to prevent bent bars from wedging into the stop plate. Vertically movable lifters on both sides of the bender lift the stock from bender pins and a pusher pushes the lifted stock out of the path of the bender pins. Stacking rolls on at least one side of the bender stack several bars in a vertical plane for simultaneous bending. The entry end conveyor table includes a stock table and discharge booster bars between conveyor rolls. Other booster bars are in the discharge end conveyor table.

BACKGROUND OF THE INVENTION

Field of the invention

This invention relates to improvement in bender tables, that is, a conveyor table assembly to be used in conjunction with a metal bender, such as, a bender for bending elongated metal bars.

Description of the prior art

Bender tables have been used for handling metal stock such as reinforcing bars for movement to and from a bender. These tables have typically been positioned on opposite sides of the bender and include conveyor rollers. Three men have been required to operate the bender and bender tables of the prior art. In order to determine where to position a bar for bending, a chalk mark or the like would be drawn on the discharge table and the men would move the stock until the end of it was aligned with the mark. After bending, the men would lift the bent bars or slide them off the bender table.

Bender table assemblies of this general type were known and used in steel warehouses where long rods and bars, such as reinforcing rods are bent to customer order. However, the prior bender tables have a number of deficiencies in that they are wasteful of man power and time consuming, especially compared to the present invention. In addition to requiring undue man power for positioning the rods for bending, man power was required for discharging the bent rods, including disengaging the rods from the bender pins. It was also difficult to bend several rods simultaneously.

The use of an ordinary mechanical stop gauge on a bender discharge table provided further problems and difficulties in that metal bars and rods abutting the stop gauge when bent by the bender would tend to wedge into and against the stop gauge and bind, thus make discharging of the bent metal even more difficult. Also, a stop gauge on a discharge table could not be used close to the bender, i.e. in the plan of the bender table and a large number of bends require a stop at this point.

SUMMARY OF THE INVENTION

This invention provides an improved bender table assembly, which is extremely economical with regard to both man power and time consumed. With the present invention bars can be quickly positioned for bending, either close to the bender pins or remote from the bender and after bending the bars will not wedge and bind against the stop. Discharging of the bars from the bender tables is easily and quickly accomplished as is freeing the bars from the bender pins or other bending mechanisms. In addition, several rods or bars may be stacked vertically and bent simultaneously.

The bender table assembly of this invention is used with a conventional or commercially available metal bending machine and includes a discharge end table positioned at the discharge end of the bender with a conveyor on top of the table for conveying metal stock in a path from the bender. A stop gauge assembly is movable along the path of the conveyor and extends across the path of the metal stock on the conveyor. An additional stop gauge assembly is mounted on the bender and moved along a portion of the path of the metal stock from a point of bending on the bender to a point adjacent the entrance to the discharge end of the conveyor. The stop gauges are mounted on carriages and are power-driven. A stacking roll assembly is provided and includes a pair of vertically extending stacking rolls which are movable into and out of stacking position. The stop gauge assembly on the discharge assembly includes a collapsible gauge plate to prevent bent bars from and binding upon bending. An entry end conveyor table is positioned adjacent the entry end of the bender and includes a power-driven stock feed assembly and booster ejector arms to eject bent stock from the side of the conveyors. Additional booster ejector arms are mounted within the plan of the discharge end table on double pivots. A pair of vertically movable lifters are positioned on each side of the bender to lift bent stock to free it from the bending mechanism of the bender and a pusher bar pushes the bent stock to one side of the bending mechanism for further conveying and discharging by the bender table assembly.

DESCRIPTION OF THE PREFERRED EMBODIMENTS

General construction

Figure 1A:
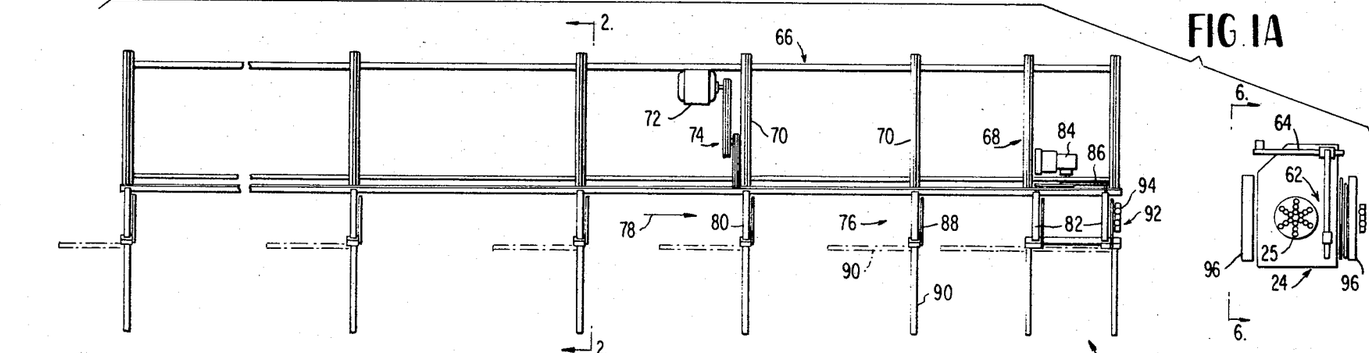
FIG. 1 is a top plan view of the bender table assembly of this invention shown in two sections, FIG. 1A showing an entry end positioned adjacent a bender and FIG. 1B showing a discharge end positioned adjacent the same bender.
Figure 1B:
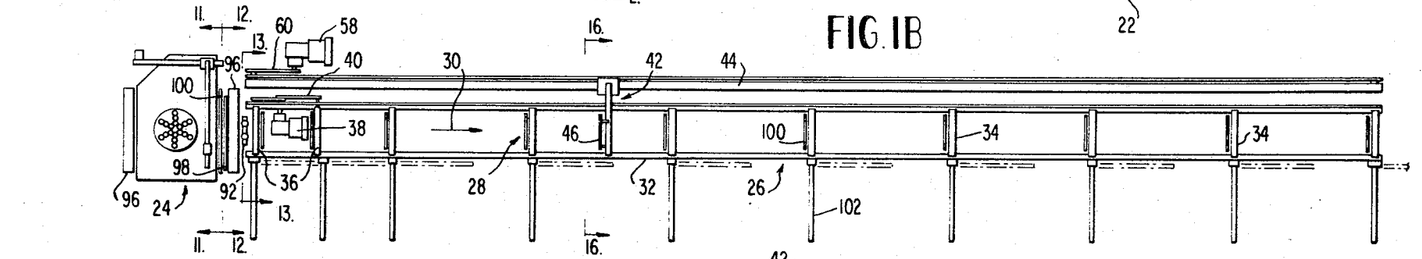

Referring to FIGS. 1A and 1B, a bender table assembly 22 of this invention is usable with a commercially available bending machine 24 of any suitable type. Such bending machines are used commonly in steel supply warehouses and other places for bending metal rods and bars, for example, reinforcing bars used in reinforced concrete.

The bender table assembly of this invention includes a discharge end table 26 positioned as shown in FIGS. 1A and 1B and having a conveyor 28 on the top surface thereof for conveying reinforcing bars or the like in a path indicated by arrow 30. The discharge end table 26 is supported by a suitable frame 32 and the conveyor 28 includes a plurality of idler rollers 34 rotatable in frame 32 and a pair of front driven rollers 36 driven by a motor 38 through a suitable drive transmission 40.

The discharge table includes a stop gauge assembly 42 which is preferably movable parallel to the path of conveyor 28 along a side rail 44. The stop gauge assembly includes a stop plate 46 in the path of bars carried by the conveyor 28 to stop such bars and position the end of the bars at predetermined distance from the bender 24. Then the bender can accomplish its bending on a predetermined position of the bar. The stop gauge assembly is movably mounted on a carriage 48 and preferable power driven through a chain 50 connected to the carriage 48 at connection 52 and trained over drive sprocket 54 and idler sprocket 56 attached to frame 32. Sprocket 54 is driven by a suitable motor 58 through a drive train 60.

Thus, the discharge end stop gauge assembly may be positioned at any point to determine the position of a bend in elongated bar transported past the bender by the conveyor 28.

In addition, a further stop gauge 62 is mounted on the bender. This bender stop gauge is also preferably movably mounted on a rail 64 extending parallel to the path of the bars to be bent so that the gauge 62 can be positioned to stop a bar to be bent with an end quite close to the bender pins 25 or other bending mechanism. Bender stop gauge 62 allows bars to be stopped very close to the bender pins, for example, if a bend would be placed in the end of a bar. If a bend were to be placed in both ends of a bar, bender stop gauge 62 could be used to stop one end of the bar for bending that end and the bender stop gauge 62 could be moved out of the way of the bar which is then driven by conveyors against discharge end stop gauge 42 which is selectively positioned such that the other end of the bar is positioned at the bender pins 25 for the desired bending.

FIG. 1A shows an entry end to table 66 having a stop rack portion 68 with stop feed chains 70 positioned at spaced points thereon. These chains are driven by motor 72 through a suitable drive transmission 74 to feed stock onto a conveyor 76 for conveying stock in a path indicated by arrow 78. The conveyor 76 includes idler rollers 80 and front driven rollers 82. The driven rollers are driven from a motor 84 through a suitable transmission 86.

Some of the bars to be bent may be discharged from the entry end by means of pusher bars 88 which rise from the horizontal plane of the conveyor and push any rods or bars on the conveyor off the side of the conveyor onto inclined side slides 90. The side slides 90 are pivotally mounted to move from a discharging position shown in full lines of FIG. 1A to a position shown in phantom lines in FIG. 1A for access. Beat bars discharge off of the inclined side slides slide onto wheeled dollys, not shown.

On each side of the bender 24 there is a stacking roll assembly 92. These stacking roll assemblies include a pair of spaced stacking rolls 94 for stacking a number of bars to be bent in a vertical plane for simultaneous bending. The stacking roll assembly is mounted for vertical movement into and out of operative position.

Also on each side of the bender 24 is a lifter roll assembly 96. These lifter roll assemblies are also vertically mounted to lift bars or rods from the top table surface of bender 24 over the top of bender pins 25 and to thereby free the bars from the bender. After the bars are lifted, a pusher bar assembly 98 pushes the lifted bars laterally so when the lifter rolls are vertically withdrawn below the level of the bender table, the bars previously engaged with the bender pins will be on an outer surface of the bender table.

For discharging from the side of the discharge end table 26 of FIG. 1b there are provided a number of booster bars 100 similar in purpose and function to the pusher bars 88. The discharge end also has inclined side arms 102 movable from a discharging position shown in full lines of FIG. 1B to an access position shown in phantom lines in FIG. 1B.

Entry end table

The entry end table 66 of FIG. 1B is shown in more detail in FIGS. 2–5. The entry end table is composed of the feed stock rack 68 built on a frame 104 which supports spaced inclined tracks 106 for feed chains 70. A stock drive shaft 108 has drive sprockets for engaging each feed chain 70, and each chain is also trained around an idler sprocket 112 adjustable by a screw adjusting mechanism 114.

Figure 2:
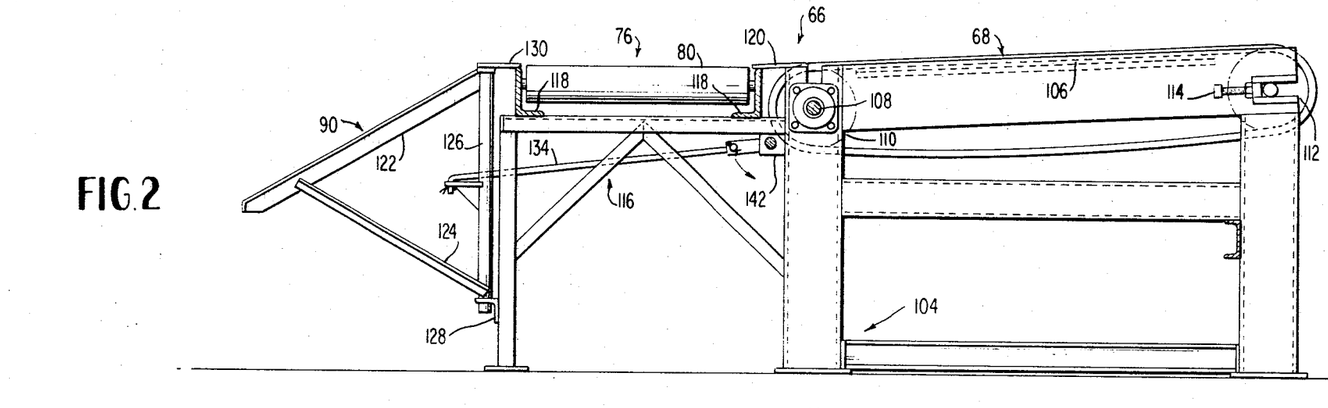
FIG. 2 is a transverse sectional elevation view taken along line 2—2 of FIG. 1A.
Figure 3:
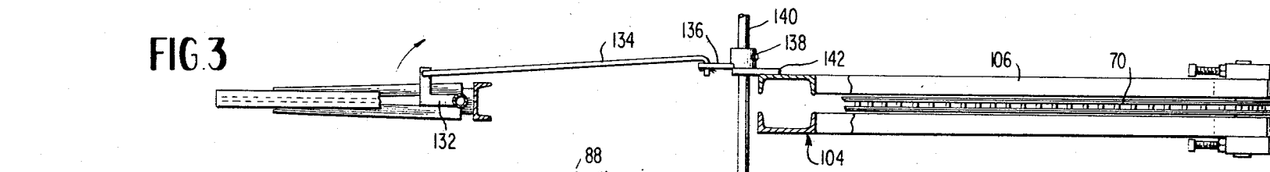
FIG. 3 is a top plan view, partially in section, of a portion of the entry end table shown in FIG. 2.

The conveyor 76, which forms the top of the entry end table, is built on a plurality of spaced frame members 116 attached to frame 104 and the conveyor rolls 80 are journalled in elongated channels 118. A bridge plate 120 extends from the feed chain 70 to the top of conveyor roll 80.

The inclined side slides 90 include a slide member 122 backed by a brace 124 and supported on a vertical shaft 126 which is pivotally mounted on a bracket 128 attached to frame 116 and a plate 130 on channel 18.

For operating all of the inclined side arms 90 simultaneously there is a connection from each arm to the other via an angle arm 132 attached to a link 134 which, in turn, is connected to a projection 136 from a collar 138 affixed to an elongated shaft 140 running the length of the entry end table, the shaft being supported in bearing plates 142. Thus, rotation of one of the inclined side arms 90 rotates shaft 140 and moves the other arms.

Figure 4:
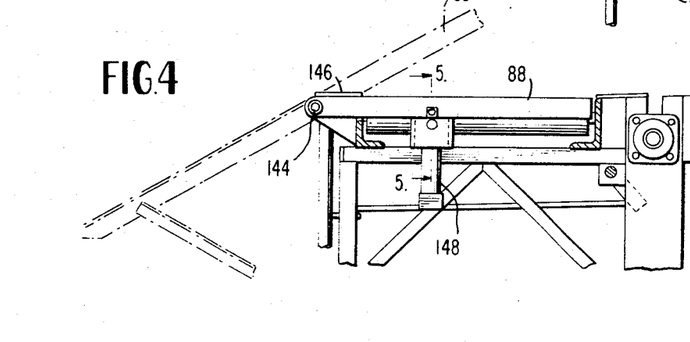
FIG. 4 is a transverse sectional elevation through a portion of the entry end table showing a booster arm.
Figure 5:
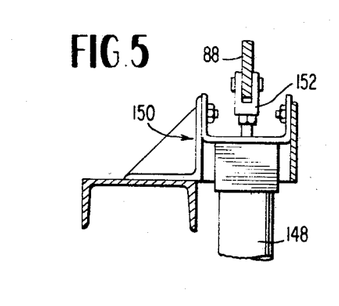
FIG. 5 is a detailed sectional view taken along line 5—5 of FIG. 4.

The pusher bars 88 are shown in more detail in FIGS. 4 and 5 and, as shown, each bar is pivotally mounted by hinge connection 144 to a bracket 146. A fluid motor of the piston and cylinder type has its cylinder mounted by a bracket support 150 to frame 116 and its piston connected by a yoke 152 to the pusher bar 88 for moving the pusher bar from the solid line position shown in FIG. 4 to an extended position show by phatom lines in FIG. 4 to push or boost bars from the top of conveyor 76 off and down to the inclined side arms 90.

Bender table stop gauge

Figures 6, 7:
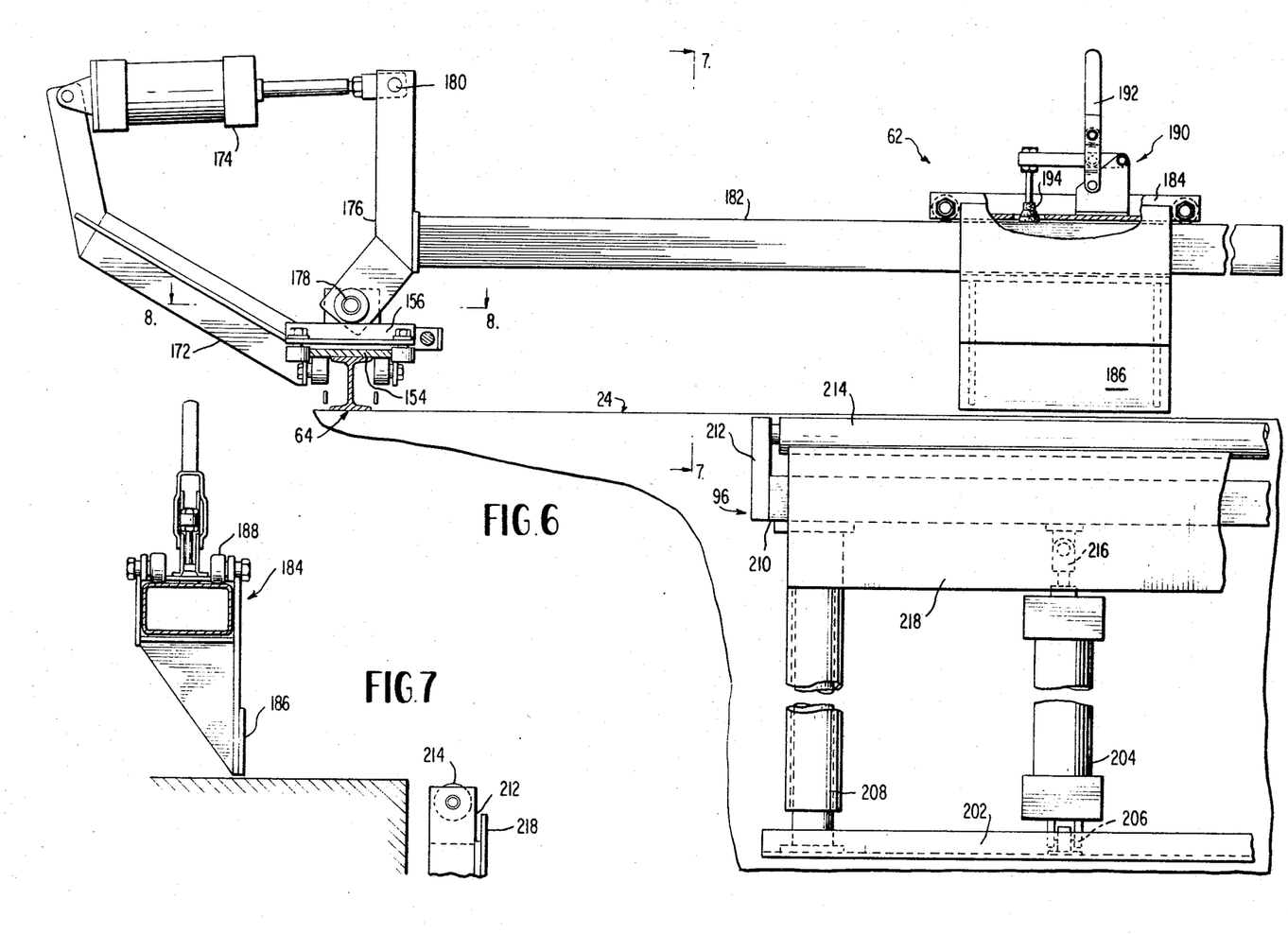
FIG. 6 is an elevation view looking along line 6—6 of FIG. 1A.
FIG. 7 is a sectional view taken along line 7—7 of FIG. 6.
Figures 8, 9:
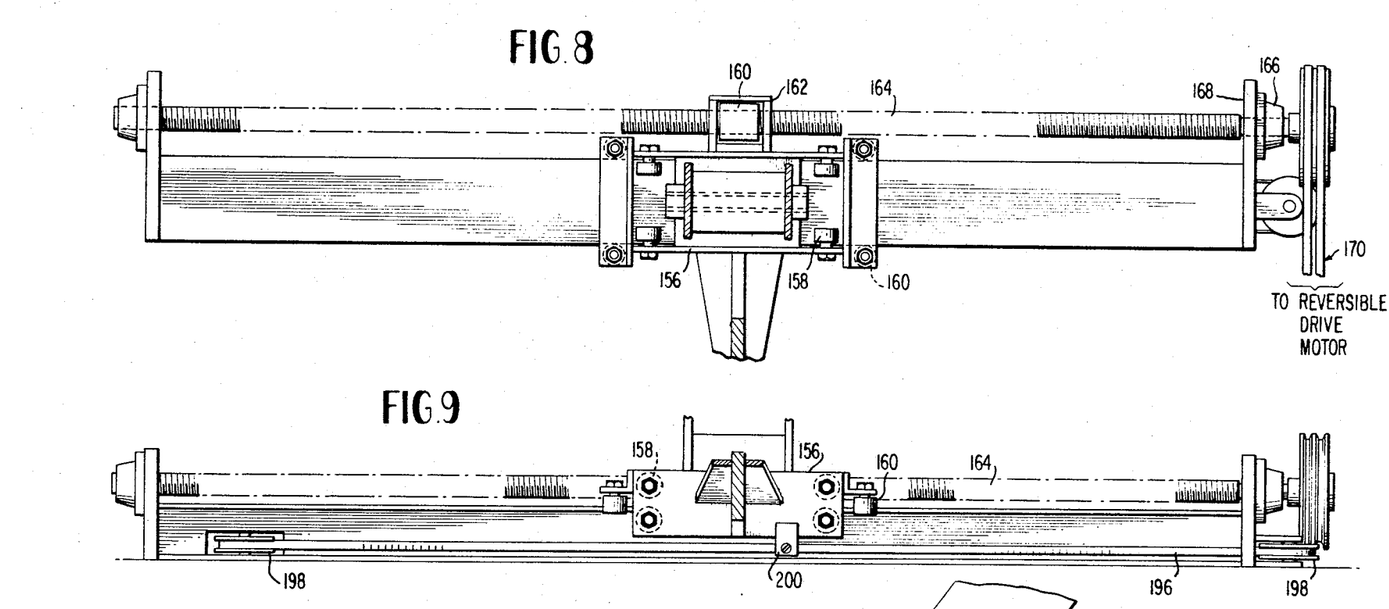
FIG. 8 is a sectional plan view taken along line 8—8 of FIG. 6.
FIG. 9 is an elevation view of a bender stop gauge carriage shown in FIG. 8.
Figure 10:
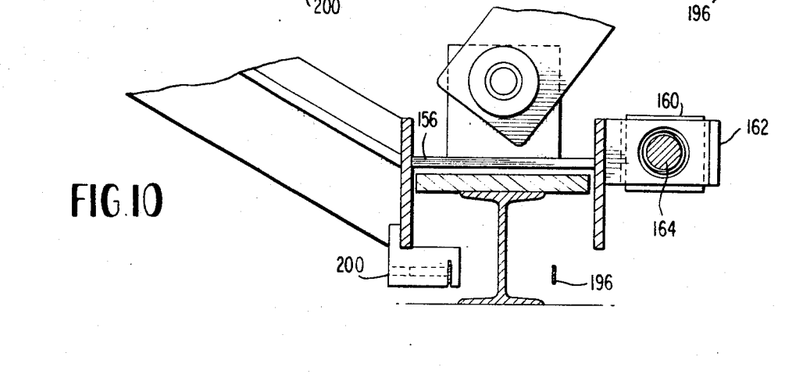
FIG. 10 is a detailed transverse sectional elevation view illustrating the bender stop gauge carriage of FIGS. 8 and 9.

The bender table stop gauge 62 mounted on rail 64 is shown in more detail in FIGS. 6–10. Referring to FIG. 6, bender table surface 24 mounts rail 64 which is in the form of a track 154 for supporting a carriage 156. Carriage 156 includes a plurality of rollers 158 on a horizontal axis and other rollers 160 on a vertical axis surrounding the sides and top and bottom of the track 154, as shown, for example, in FIGS. 8 and 9. Drive of the carriage is via a screw and nut arangement including a nut 160 loosely captured in a box 162 rigid with the carriage 156. The nut 160 is threadedly engaged by a drive screw 164 journalled by bearings 166 in brackets 168 attached to the end of the rail 64. A suitable drive connection 170 connects the lead screw to a reversible drive motor.

Carriage 156 has an extension 172 extending outwardly thereof for hingely mounting a fluid motor 174 of the piston and cylinder type. A movable arm 176 is connected at hinge 178 to a projection extending from top of carriage 156. The piston rod of cylinder 174 is connected at pivot point 180 to the top of arm 176. Arm 176 rigidly supports a rail 182 extending across the surface of the bender 24 over the path of metal bars to be bent. This rail 182 mounts a movable stop gauge plate carriage 184 carrying a stop plate 186 by means of wheels 188 journalled on the carriage, see FIG. 7. A conventional toggle clamp 190 supported by the top of cariage 184 includes a stop member 194 actuated by lever 192 to contact the top of rail 182 and stop the plate 186 in any predetermined position transverse to the path of movement of bars across the bender.

For determining or setting the position of the bender stop gauge 62 along rail 64 a gauge tape 196 is provided trained around pulleys 198 and attached to carriage 156 by connection 200.

As can be seen, actuation of motor 174 to pull arm 176 counterclockwise raises the bender stop gauge 62 out of stopping position. The position of the stop plate 186 can be set with respect to the path of the metal to be bent by operaing toggle 190 and moving the stop gauge plate carriage 184 on rail 182.

Lifter roll assembly and pusher bar

The lifter roll assemblies 96 on opposite sides of the bender 24 are substantially similar in construction. The lifter bar on the entry side of the bender 24 is shown in FIGS. 6 and 7 and includes a frame 202 supporting a fluid motor 204 of the cylinder piston type which is hinged at 206 to the frame. A pair of telescoping guide posts 208 are at opposite side edges of the lifter roll assembly 96 and are connected at the top end of the outer telescoping post to a roll frame 210 having side members 212 journalling a rotatable lifter roll 214. The roll frame 210 is hingedly connected to the piston rod 216 of fluid motor 204 so that actuation of fluid motor 204 moves the lifter roll vertically upwardly above the top surface level of bender 24 carrying any bars on the top of the bender table upwardly so that the bars will clear the top of bender pins 25. A protecting plate 218 may be utilized to protect a portion of the mechanism below the lifter roll 24 in case a bent bar is fed to the bender 24.

Figures 11, 12:
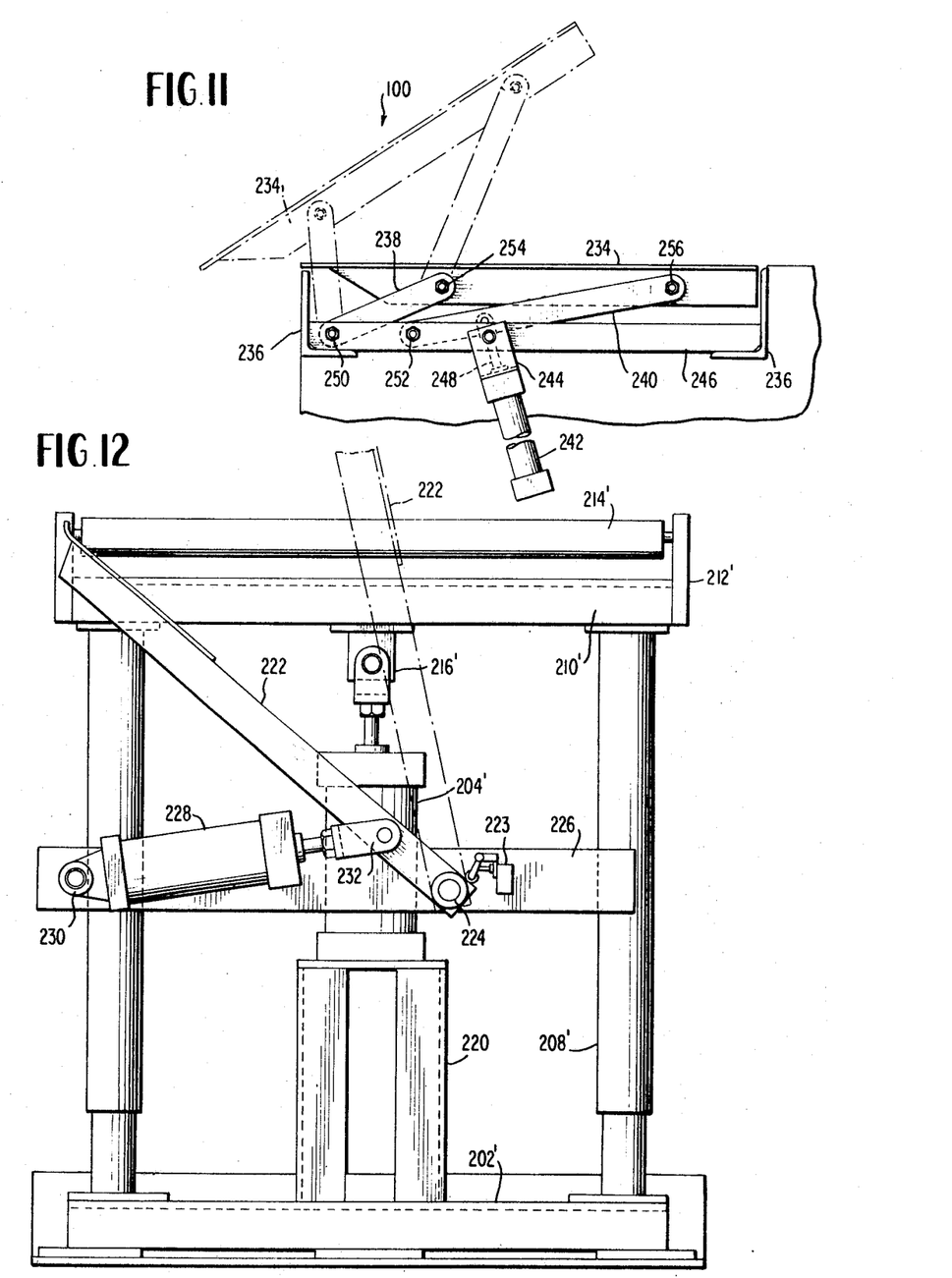
FIG. 11 is an elevation view looking along line 11—11 of FIG. 1B.
FIG. 12 is an elevation view looking along line 12—12 of FIG. 1B.

Referring now to FIG. 12, the lifter roll assembly 96 on the discharge end of the conveyor is shown and includes a frame 202' mounting a fluid motor of the cylinder and piston type 204' on a pedestal 220. Telescoping guide post 208' at opposite sides are connected at the top to a roll frame 210' and the bottom to the frame 202'. Side members 212' again rotatably mount a lifter roll 214'.

Fluid motors 204 and 204' are operated simultaneously to cause lifter rolls 214 and 214' to move upwardly.

After the lifter rolls have moved upwardly to free bars from bender pins 25 the bars may be pushed to the side of the bender pins by a pusher bar 222 hingedly mounted by hinge connection 224 through a cross member 226 connected to the vertically movable outer telescoping posts 208'. A fluid motor of the cylinder piston type 228 has its cylinder connected by pivot connection 230 to member 226 and its piston rod connected by yoke 232 to pusher bar 222 to cause the pusher bar to move from the solid line position of FIG. 12 to the dotted line position of FIG. 12 further and, thereby, push bars which have been lifted by lifter rolls 214 and 214' to one side of the bender pin so that when the lifter rolls are lowered the bars clear the bender pin. A suitable switch 223 may be utilized to detect the position of the pusher bar 222.

Booster bar

The booster bar 100 at the discharge side of the bender 24 is of different construction than the pusher bar 88 on the entry side due to the fact that the booster bar must clear side rails. The construction of the booster bar 100 as shown in FIG. 11 includes a bar member 234 mounted between a pair of side frame members 236 and connected to a cross member 248 by a short idler link 238 and long driven link 240. A drive cylinder 242 is connected by a bracket 246 to the cross member 248 and its piston rod 248 is connected to the drive link 240. Hinge connections 250 and 252 are provided between the short and long links 238 and 240, respectively, toward one side of the cross member 246 and other hinge connections 254 and 256 connect the other ends of links 238 and 240 to the bar member 234.

Operation of motor 242 to extend the piston rod 248 will cause the booster bar member 234 to move from the line of FIG. 11 to the dotted line position of FIG. 11. The double pivoting arrangement allows the booster bar to move outwardly over the edge of the frame members 236 while being pivoted from within the frame members.

Stacking roll assembly

Figure 13:
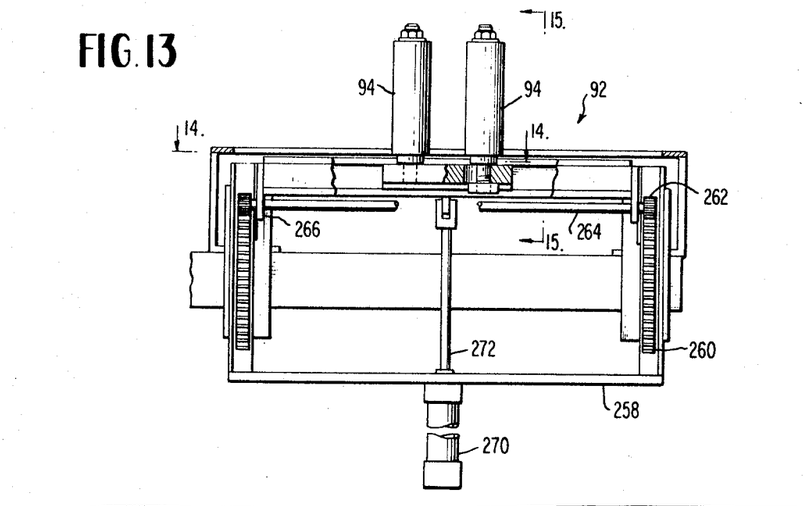
FIG. 13 is an elevation view looking along line 13—13 of FIG. 1B.
Figures 14, 15:
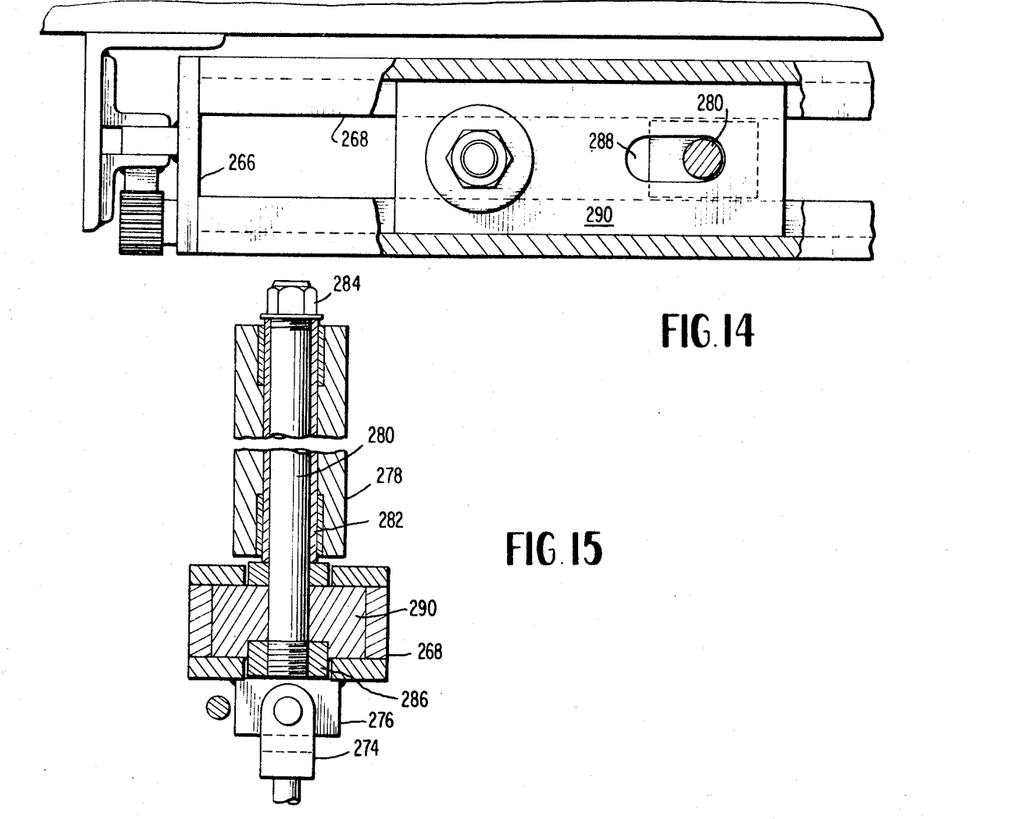
FIG. 14 is a sectional view taken along line 14—14 of FIG. 13.
FIG. 15 is a sectional view taken along line 15—15 of FIG. 13.

The stacking roll assembly 92 is best shown in FIGS. 13–15 and include a frame 258 mounting vertical rack portions 260 for cooperation with pinions 262 on opposite ends of a shaft 264. The shaft 264 is journalled in depending lugs 266 from a divided track support 268. A cylinder 270 is mounted to frame 258 and its piston rod 272 is connected by yoke 274 to a bridge member 276 rigid with the divided track 268 so that actuation of the cylinder to extend the piston rod will move the rolls 94 vertically upwardly from a position below the top of the conveyors and the path of the bars to a position where the rolls will stick up above the top of the conveyors and cause the bars to be stacked vertically between the rolls.

Each roll 94 includes a roll cylinder 278 mounted on a post 280 and journalled thereon by bearings 282. The post has a top stop nut 284 and one post has a lower nut 286 in the track for holding the bottom of the post 280. A slot 288 in a member 290 through which the post 280 passes allows one of the rolls 94 to be moved horizontally relative to the other roll 94 to accomodate different sizes of bars to be bent.

Discharge end stop gauge

The stop gauge assembly 42 for the discharge end table is shown in detail in FIGS. 16–19.

Figure 16:
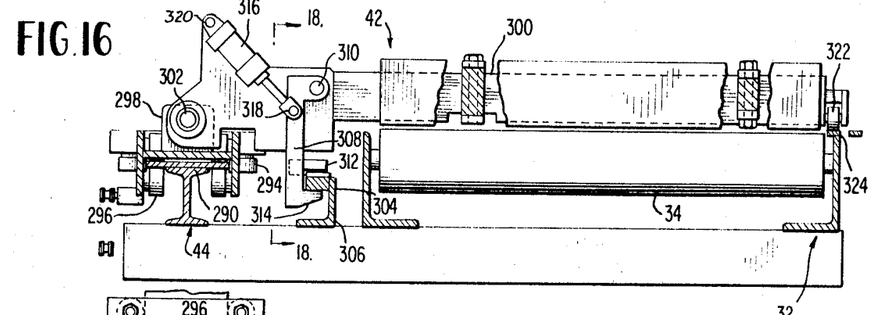
FIG. 16 is a transverse sectional elevation view taken along line 16—16 of FIG. 1B.
Figure 17:
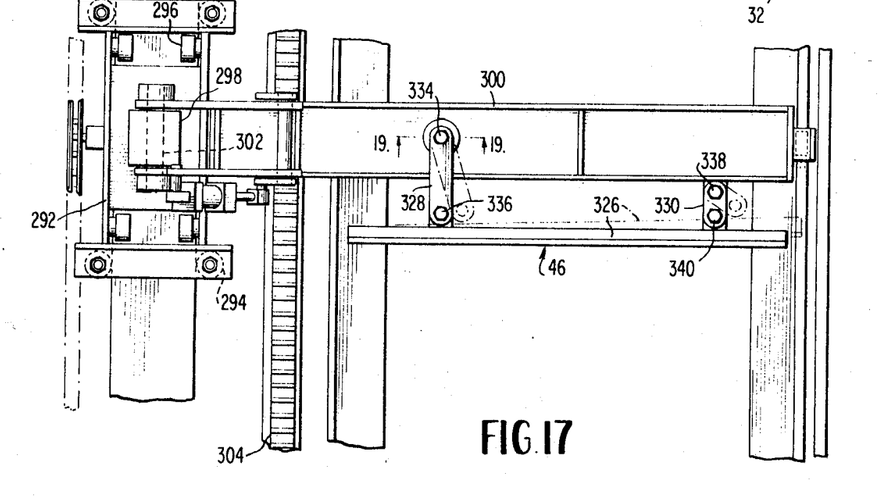
FIG. 17 is a top plan view of the discharge end stop gauge shown in FIG. 16.

The rail 44 on which the stop gauge moves includes a track 290 mounting a carriage 292 which is substantially similar to the carriage 156 of the bender stop gauge. Carriage 292 moves along the tracks on sets of antifriction rollers 294 and 296 mounted from the carriage on vertical and horizontal axis, respectively, to sandwich the sides it faces of the track 290.

A bearing post 298 extending upwardly from the top of the carriage 292 hingedly mounts a stop arm 300 on a pin 302.

The position of the carriage 292 may be locked by means of a locking arrangement including a locking rack 304 mounted on a channel 306 extending the length of the conveyor. The arm 300 pivotally mounts a pair of locking fingers 308 on a hinge pin 310. The fingers carry therebetween a rack portion 312 for cooperation with stationary rack 304 and a hook lower end 314 of the fingers 308 goes under the stationary rack 304.

A cylinder 316 is pivoted by connection 320 to arm 300 and has its piston rod connected by pivot connection 318 to finger 308 for moving the locking fingers into and out of locking engagement with rack 304.

A roller 322 rotatably journalled on the end of arm 300 supports the arm in operative metal stopping position and rolls along a track 324 on top of side frame 32.

Figures 18, 19:
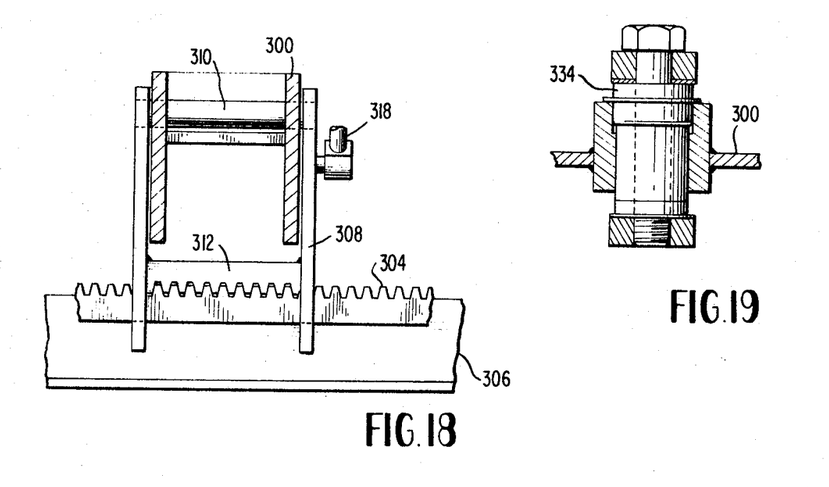
FIG. 18 is a detailed sectional view taken along 18—18 of FIG. 16.
FIG. 19 is a detailed sectional view taken along 19—19 of FIG. 17.
Figure 20:
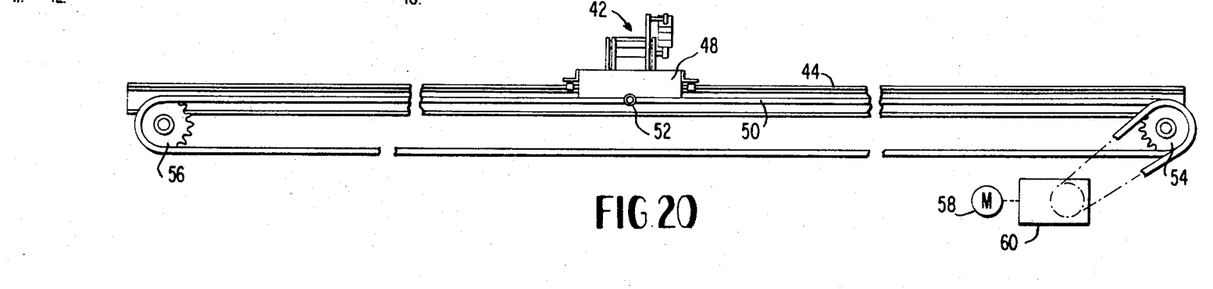
FIG. 20 is a side elevation view of the discharge table stop gauge carriage drive shown partially schematically.

The stop plate 46 includes a unique mounting for a plate member 326 so that the plate member may move from a solid line position shown in FIG. 17 to the phantom line position shown in FIG. 17 upon bending of a bar abutting the stop plate. Ordinarily, the bending forces applied to the bar tend to wedge the bar against the stop plate, but if the stop plate is collapsible under forces applied transverse to the axis of the conveyor the bar will not be wedged or held. This is accomplished in the present invention by the use of a mounting including a long pivoted link 328 and a short pivoted link 330 connected by a torsion spring connection 334 and pivot hinge connections 336, 338 and 340 to the arm 300 and the plate member 326 as shown in FIGS. 16, 17 and 19. The torsion rubber spring 334 of a commercially available type normally holds the stop plate 46 in the solid line position, but on a force applied transversely to the stop plate, for example, when bars are bent by the bender and abutting against the stop plate, the stop plate swings to the phantom line position thus releasing the bars for discharge to the side.

Operation

A brief resume of the operation will now be given. The bender table of this invention allows one man to operate and bend substantially more tonnage of metal bars than could be accomplished by a three man crew using the prior art. An operator, operating from a control panel (not shown) would operate the stock rack 68 of the entry end 64 by actuating motor 72 to drive feed chain 70 driving the bar to be bent onto the entry end conveyor 76 where the driven rolls 82 may be activated by energizing motor 84 to drive the bars across the bender pins 25 of the bender 24. If, for example, it was desired to place a band or a hook in the lead end of a bar, bender stop gauge 62 would be utilized by the operator actuating toggle 190 to position stop plate 186 in the path of the bar and actuating the motor driving the lead screw 164 to position the stop 186 relative to the path of movement of bar to determine the place at which the bend will be made. The position may be read on the tape 196 by means of a pointer convenient to the operator who stands adjacent the bender 24. After a bend has been made the motor 84 energized to drive the bar further through the bender until the lead end of the bar abuts against stop plate 46 of the discharge end stop gauge 42. The operator has previously energized motor 58 to position stop gauge 42 after first releasing the lock of stop gauge 42 by actuating cylinder 316 to retract locking finger 308. After the stop gauge 46 is positioned, cylinder 316 is actuated to move the lock into locking position and motor 38 may be energized to drive conveyor rollers 36 to drive the bars against the stop plate 46 for positioning the bars by bending by the bender pins 25.

During such bending, the bender pins tend to cause the end of the bars to wedge against the stop plate 46, but such wedging forces are applied transversely to stop plate 46 causing it to assume the phantom line position of FIG. 17 and prevent such wedging or binding of the bar. After the bar has been further bent by the bender 24 the lifter assemblies 96 and 96' may be actuated by energizing motors cylinders 204 and 204' to lift the bar out of the bender pins and cylinder 228 is energized to cause pusher bar 222 to push the bent bars free from the bender pins. For discharging if the bent bars are on the discharge end, booster bars 100 are actuated by motors 242 to boost the bars from the conveyor onto the slide arms 102. Sometimes the bar will remain with a good portion on the entry end and in such a case, pusher bars 88 are actuated by motors 148 to again pusher boost the bent bars onto the inclined side arms 90. If an operator needs to get into the path beside either the discharge entry end tables he merely swings one of the side arms 90 to the phantom line position or one of the side arms 102 to the phantom line position allowing access to the aisle. Bent discharge bars slide down arms 90 to 102 onto dollys (not shown) for further transporting.

Various modifications may be made to the preferred embodiment described. For example, there may be more than one stop gauge assembly 42 on the discharge table, and such assemblies may be manually moved rather than being motor driven. Of course, in such case, the assemblies in front of the one being used would be raised on pivot pin 302 to an inoperative position.

We claim:

1. A bender table assembly for use with a metal bending machine, the bender table assembly capable of handling elongated metal stock, such as bars to be bent by the bender, the assembly comprising:
   (a) a discharge end table positioned at the discharge end of the bender,
   (b) a conveyor on the top of the discharge end table for conveying metal stock in an elongated path from the bender,
   (c) a stop gauge assembly movable along the conveyor, including a stop extending across the path of metal stock on the conveyor, the stock thereby being selectively positionable at predetermined distances along the conveyor from the bender, and
   (d) a bender stop gaueg assembly movable along a portion of a path of metal stock on the bender.

2. A bender table assembly as in claim 1 wherein the bender stop gauge assembly includes a carriage mounting a pivotable arm, a stop plate slidable along the arm, and power means actuating the pivotable arm to move the stop out of stopping position to allow the bender to operate without obstruction from the stop when required.

3. A bender table assembly as in claim 2 further comprising drive means to drive the carriage of the bender stop gauge, the drive means including a drive motor, a screw driven by the motor and a nut threaded on the screw and loosely mounted on the carriage.

4. A bender table assembly as in claim 1 further comprising a stacking roll assembly on at least one side of the bender, the stacking roll assembly including a pair of vertically extending stacking rolls and a power operator for moving the stacking roll assembly from a position with the top of the stacking rolls below the path of stock on the conveyor to a stacking position with the stacking rolls in the path of stock on the conveyor.

5. A bender table assembly for use with a metal bending machine, the bender table assembly capable of handling metal stock such as bars to be bent by the bender, the assembly comprising:
   (a) a discharge end table positioned at the discharge end of the bender,
   (b) a conveyor on the top of the discharge end table for conveying metal stock in an elongated path from the bender,
   (c) a stop gauge assembly movable along the conveyor and having a stop plate extending across the path of metal stock on the conveyor, the stock thereby being selectively positionable at predetermined distances along the conveyor from the bender, the stop gauge assembly including a stop gauge arm extending across the conveyor and a stop gauge plate in front of the stop gauge arm to stop metal stock on the conveyor, and (d) means movably mounting the stop gauge plate from the stop gauge arm such that when metal abutting the stop gauge plate is bent by the bender and tends to wedge against the stop gauge plate, the plate will move to prevent such wedging with one end of the plate moving toward the stop gauge arm.

6. A bender table assembly as in claim 5 wherein the means movably mounting the stop gauge plate, the stop gauge arm includes a pair of pivotal links, one of the links being longer than the other, and a resilient bushing mounting one of the links to the stop gauge arm.

7. A bender table assembly as in claim 5 wherein there is a single stop gauge assembly which includes a carriage mounting the arm, the carriage movable on a rail parallel to the path of the conveyor, means for driving the stop gauge assembly along the rail, and a locking arrangement to lock the stop gauge assembly in any predetermined position.

8. A bender table assembly as in claim 7 wherein the locking arrangement includes an elongated stationary rack beside the conveyor and a cooperating locking member carried by the carriage.

9. A bender table assembly for use with a metal bending machine, the bender table assembly capable of handling elongated metal stock, such as bars to be bent by the bender, the assembly comprising:

(a) a discharge end table positioned at the discharge end of the bender.

(b) a conveyor on the top of the discharge end table for conveying metal stock in an elongated path from the bender, (c) a stop gauge assembly movable along the conveyor, including a stop extending across the path of metal stock on the conveyor, the stock thereby being selectively positionable at predetermined distances along the conveyor from the bender, and (d) an entry end table positioned adjacent the entry end of the bender, a roller conveyor with at least some powered rolls on the top of the entry end table, a power-driven stock feed assembly on the side of the entry end table, and booster ejector arms rising from below the path of stock on the conveyors of both the entry end at discharge end tables for ejecting stock to the side of the conveyors.

10. A bender table assembly as in claim 9 wherein the booster ejector arms are pivotally mounted and at least the discharge table conveyor are doubly pivotally mounted from pivots within the sides of the conveyor.

11. A bender table assembly as in claim 10 further comprising side slide arms extending obliquely downwardly from the top of the sides of both the discharge end table and entry end table, and means pivotally mounting each slide arm on a vertical axis adjacent the table so that the slide arms can be pivoted as a unit out of the way for access to the side of the conveyor.

12. A bender table assembly as in claim 9 further comprising a lifter roll assembly on each side of the bender, each lifter roll assembly having a lifter roll normally below the path of stock conveyed by the conveyors, and power means operable to raise the lifter roll above the path of stock on the conveyor.

13. A bender table as in claim 12 further comprising a pusher bar adjacent at least one lifter roll assembly, the pusher bar being pivotally mounted and power operated to push stock lifted by the lifter roll assembly toward one side of the bender.

References Cited

UNITED STATES PATENTS

| | | | |
|---|---|---|---|
| 2,430,899 | 11/1947 | Wallace | 72—461 |
| 2,782,831 | 6/1955 | Todd | 72—461 |
| 2,627,890 | 2/1953 | Lloyd et al. | 72—461 |
| 3,455,141 | 7/1969 | Bracco et al. | 72—421 |
| 2,954,130 | 9/1960 | Krebs | 72—426 |

CHARLES W. LANHAM, Primary Examiner

M. J. KEENAN, Assistant Examiner

U.S. Cl. X.R.

72—461